United States Patent [19]
Hicks

[11] Patent Number: 6,012,878
[45] Date of Patent: Jan. 11, 2000

[54] PRESSURE BALANCED SUBSEA TAPPING MACHINE

[75] Inventor: David J. Hicks, Tulsa, Okla.

[73] Assignee: TDW Delaware, Inc., Wilmington, Del.

[21] Appl. No.: 09/183,710

[22] Filed: Oct. 30, 1998

Related U.S. Application Data

[60] Provisional application No. 60/069,126, Dec. 2, 1997.

[51] Int. Cl.[7] .............................. B23B 35/00; B23B 41/08
[52] U.S. Cl. ........................... 408/1 R; 137/15; 137/318; 408/87; 408/241 R; 408/710
[58] Field of Search ................................ 408/1 R, 56, 76, 408/87, 92, 97, 110, 234, 241 R, 710; 137/15, 317, 318

[56] References Cited

U.S. PATENT DOCUMENTS

| | | | |
|---|---|---|---|
| 884,565 | 4/1908 | Bryan | 408/87 |
| 2,840,166 | 6/1958 | Eckel et al. | 137/318 |
| 3,614,252 | 10/1971 | Rose et al. | 408/9 |
| 4,579,484 | 4/1986 | Sullivan | 408/56 |
| 5,439,331 | 8/1995 | Andrew et al. | 408/8 |

*Primary Examiner*—Daniel W. Howell
*Attorney, Agent, or Firm*—Head, Johnson & Kachigian

[57] ABSTRACT

A machine for use underwater and therefor subject to ambient hydrostatic pressure for tapping a pressurized pipeline has an elongated tubular tapping machine body with a boring bar therein that receives a cutter at its lower end. A passageway in a lower end portion of the tapping machine body senses the internal pressure of a pipeline after the pipeline is penetrated by the cutter, the passageway being connected to a pressure equalizer having communication with the interior of the tapping machine body to thereby balance hydraulic forces applied to the boring bar during a tapping operation. The machine has a gear case affixed to the tapping machine body to actuate the boring bar, the tapping machine body being sealed from the gear case, and including a fluid isolating equalizer supported to the tapping machine body and having a first communication with the interior of the gear box and a second communication with ambient hydrostatic pressure to thereby at least substantially equalize pressure in the gear box with the ambient hydrostatic pressure.

4 Claims, 5 Drawing Sheets

PRESSURE BALANCED SUBSEA TAPPING MACHINE

REFERENCE TO PENDING APPLICATIONS

This application claims the benefit of and incorporates by reference prior filed Provisional Application Ser. No. 60/069,126 filed Dec. 2, 1997 entitled A PRESSURE BALANCED SUBSEA TAPPING MACHINE.

REFERENCE TO MICROFICHE APPENDIX

This application is not referenced to any pending United States or international patent application and is not referenced in any microfiche appendix.

BACKGROUND OF THE INVENTION

Motor driven tapping machines have been utilized for cutting circular holes in pipe sidewalls from at least 1971 when U.S. Pat. No. 3,614,252 issued. This patent discloses a tapping machine that has a feed screw for moving a boring bar axially upon rotation of the boring bar relative to the feed screw. A drive sleeve rotates the boring bar to provide such relative rotation and to rotate a cutter attached to the boring bar to cause the cutter to cut a hole in a pipe. The boring bar may have either a fixed or a variable feed rate depending upon the design of the tapping machine.

The tapping apparatus disclosed in U.S. Pat. No. 3,614,252 does not provide for pressure equalization and therefore when penetration is made into a pipeline that is under pressure, the internal pressure of the pipeline is applied to the boring bar and this pressure must be overcome by the motor used to advance the boring bar.

Tapping machines for use underwater have been known since at least 1986 when U.S. Pat. No. 4,579,484 issued, the patent being entitled "Underwater Tapping Machine". This patent discloses a tapping machine body equipped for attachment to a fitting secured to a pipeline and has a rotatable boring bar within the tapping machine body. A gear case is affixed to the body to activate the boring bar. A containment vessel is supported by the tapping machine body and has a first opening that communicates with the interior of the tapping machine and a second opening that communicates with the environment, that is, with a body of water, such as a lake, river or ocean, in which the tapping operation is carried out. A fluid barrier is provided in the containment vessel separating the first and second openings.

The portion of the containment vessel that is in communication with the interior of the boring bar apparatus is filled with a lubricant consistent with the lubricant normally employed in the boring tool so that ambient pressure experienced by the boring tool is equalized with the interior of the boring tool. In U.S. Pat. No. 4,579,484 the equalization pressure from the containment vessel is applied both to the interior of the boring bar body and at the same time to the interior of the gear case. The disclosures and teachings of U.S. Pat. No. 4,579,484 have been important in the advancement of the use of tapping machines in underwater applications.

The problem encountered when cutting an opening in a wall of a pipeline that is under pressure (referred to in the industry as shot "tapping") was addressed in U.S. Pat. No. 5,439,331 that issued on Aug. 8, 1995, entitled "High Pressure Tapping Apparatus". This patent discloses and teaches an apparatus for tapping an opening into an existing pipeline that may be under high internal pressure and provides a tapping machine body having a feed screw and a boring bar therein with means to rotate the feed screw and the boring bar to tap the pipeline, including means for sensing the pipeline pressure and for using the sensed pressure to balance the force applied against the boring bar resulting from the internal pressure of the pipeline.

The above referenced patents provide good background information as to the state of the art to which the present invention pertains.

SUMMARY OF THE INVENTION

Forming an opening in the wall of a pipeline that is under pressure (hot tapping) is difficult and time consuming and requires well engineered and constructed tapping equipment. It is known that pressure from within a pipeline acts against the tapping apparatus, thus reducing the cutting rate while increasing operating loads across the internal working mechanisms of the tapping machine. The increased wear and tear on the tapping machine reduces its efficiency and useful life.

The present invention is directed towards an improved tapping apparatus that works more efficiently and effectively when cutting into a submerged pipeline having high internal pressure. When a tapping apparatus is used on land it is exteriorly subjected only to atmospheric pressure which varies so insubstantially that the ambient pressure is insignificant. However, when a tapping machine is used in a lake, or more usually, in an ocean, and at a significant depth, hydrostatic pressure on the exterior of the machine is increased dramatically and in direct proportion to the depth at which a tapping operation is undertaken.

Pipeline pressure acts on the projected area of the tapping apparatus boring bar and generates a load across the apparatus feed screw. The feed screw mechanism is a primary means of advancing a boring cutting bit into a pipeline. Increase in the load across the feed screw requires higher input torque to operate the equipment. The higher load results in increased stress throughout the structural members of the tapping apparatus that may eventually result in premature failure. The present invention provides a tapping apparatus having means for equalizing the pressure interiorly of the boring bar housing to match the internal pressure of a pipeline being penetrated as a opening in the pipeline is cut by a rotating circular cutter. More specifically the present invention provides a tapping machine in which the boring bar that operates within an elongated tubular housing is sealed at its upper and lower ends and means is provided to communicate this sealed area with the internal pressure of the pipeline so that in a boring operation once a pipeline has been penetrated to expose the boring tool to the internal pipeline pressure, the pressure of the pipeline is immediately transferred to the hydrostatic pressure within the interior of the boring bar housing. Hydrostatic pressure is transmitted to the interior of the housing by way of lubricant oil of the same kind of lubricant oil normally filling the interior of the housing. Further, the pipeline pressure is equalized within the interior of the boring bar tubular housing irrespective of change in the internal volume of the housing as the boring bar advances.

To equalize pressure within a boring bar tubular housing with the internal pressure of a pipeline, the internal pipeline pressure is applied to a containment vessel having two compartments separated by a flexible bladder. One compartment is in communication with the interior of the pipeline being penetrated and the other compartment is in communication with the interior of the boring bar housing. A flexible member, such as a flexible bladder, separates the two areas to allow the pressure on either side of the flexible bladder to remain the same but to prevent fluid transfer from one area of the housing to the other.

In addition to the serious problem of balancing the pressure within a boring bar housing, another problem develops when a tapping machine is used in a submerged application such as when used to tap a pipeline within a deep lake or more usually, within the ocean. Tapping machines universally require a gear box to which a motor, usually a hydraulic motor, is attached, the gear box functioning to communicate rotational energy from the motor to rotate a boring bar and the tapping machine feed screw. Thus, the gear box is customarily maintained as a sealed housing that is exterior of the boring bar tubular housing. To maintain a minimal reasonable weight for an undersea boring tool the gear box housing is formed of metal of minimal thickness. However, it is also highly important that the gear box be constructed so that it will not be crushed by sea water when the tapping apparatus is used to tap a hole in a pipeline at a substantial depth. In addition to the requirement that the gear box not be crushed by the hydraulic pressure encountered in deep sea operations, it is also important that the pressure applied against seals be kept to a minimum. Accordingly, it is desirable that the tapping machine be arranged in such a way that the pressure interiorly of and exteriorly of the gear box does not materially change irrespective of the depth to which the tool is employed.

This invention overcomes the problems associated with using a tapping machine at deep submerged depths by providing a system in which the interior pressure of the gear box is equalized with external sea water pressure irrespective of the depth at which the tapping machine is used.

DESCRIPTION OF THE DRAWINGS

FIG. 1 shows saddles that have been secured to the exterior of the pipeline on opposite sides of the damaged area and shows sandwich valve structures attached to the saddles. One of the saddles is shown having attached to it an underwater tapping machine of the type to which the present invention applies. The tapping machine is shown diagrammatically only to show the environment in which it is employed.

FIG. 4 shows a boring bar extending telescopically out the lower end of the tapping machine tubular housing. Further, FIG. 4 shows a passageway employed to provide communication between the interior of a pipeline after it is penetrated by a circular cutting tool with a containment vessel having a flexible bladder therein.

FIG. 5 shows the passageway by which equalizing lubricant communicates between the interior of the gear box and a containment vessel by which the hydrostatic pressure interiorly and exteriorly of the gear box is equalized.

DETAILED DESCRIPTION OF THE PREFERRED EMBODIMENTS

Figure 1:
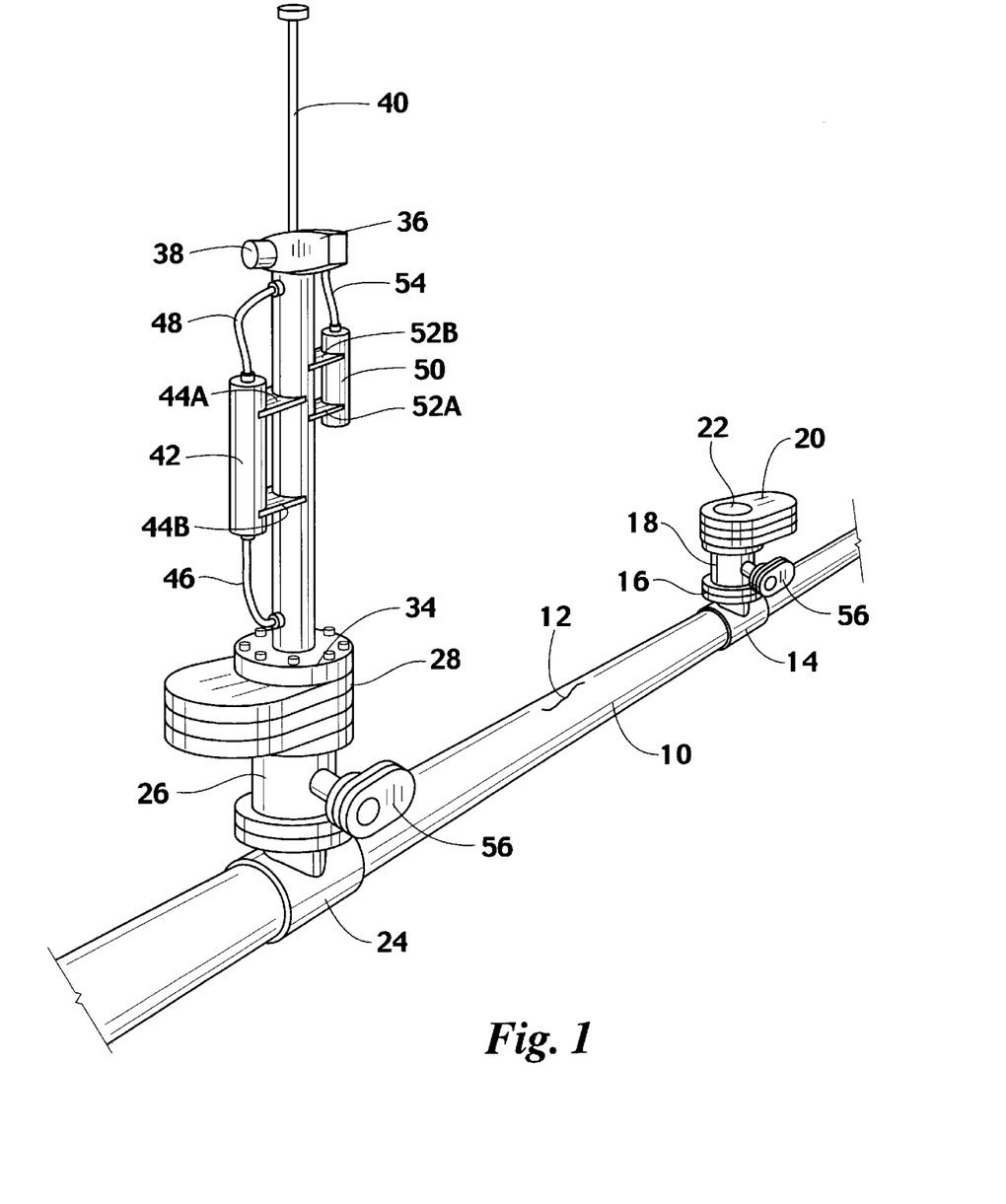
FIG. 1 is an isometric somewhat diagrammatic view of a pipeline as it exists in a subsea location and shows a damaged section that requires removal.

Referring first to FIG. 1, the environment in which a subsea tapping machine is employed is diagrammatically illustrated. A pipeline is indicated by the numeral 10, the pipeline being located at a significant depth in the ocean. For purposes of illustration, the pipeline is presumed to have a damage area 12 that can occur for a variety of reasons. For instance, if a ship anchor is drug against a pipeline it can damage the pipeline or the damaged area 12 may be the consequence of a crease or buckle that occurs in the process of laying the pipeline. A common procedure in the operation of a pipeline is to keep the interior walls clean by passing pigs through the pipeline. When indentations, dents or buckles occur in a pipeline wall, it can interfere with the passage of a pipeline pig. In any event, a damage area 12 is one example of why underwater tapping machines are required in the operation and maintenance of a subsea pipeline. Another example would be a hot tap to add a branch connection (not shown) to the pipeline.

Affixed to the exterior of pipeline 10 is a first T-fitting 14 that is attached, such as by fasteners, to the exterior of the pipeline, while the pipeline remains operative and under pressure. T-fitting 14 includes a flange 16 to which is bolted an adapter 18 and on the adapter 18 is a valve 20, typically a sandwich-type valve.

A second T-fitting 24 is in like manner affixed to pipeline 10 on the opposite side of damage area 12 to which an adapter 26 and valve 28 are affixed. Secured to valve 28 is an underwater tapping machine generally indicated by the numeral 30. Tapping machine 30 includes, as basic components, an elongated tubular housing 32 that, in a manner to be described subsequently, includes a telescopically operated boring bar, the housing having at its lower end thereof a flange 34 by which the tubular housing 32 is removably secured to the top of valve 28.

The tapping machine is shown as affixed directly to valve 28 which is possible in some applications, depending on the type of valve 28, however in most installations a tapping machine adapter housing (not shown) is positioned between valve 28 and tapping machine flange 34. The function of an adapter housing in this location is to provide space for a cutter or a pilot drill secured to the lower end of a boring bar, or to receive a locking plug to be inserted through the valve to close adapter 26, or to receive a coupon having been cut from pipeline 10, as examples. An adapter housing is not shown between valve 28 and flange 34 since such usage is not always mandator although it is common, and is well known to practitioners in the pipeline tapping art. Further, whether a tapping machine adaptor housing is used or not is unrelated to the essence of the invention to be described herein.

At the upper end of tubular housing 32 is a gear case 36 and attached to it is a motor 38 by which a boring bar within the tapping machine is rotated. Motor 38 is typically operated by use of pressurized hydraulic fluid and accordingly, hydraulic hoses (not shown) typically extend from motor 38 to a source of pressurized hydraulic fluid (also not shown). Extending coaxially and telescopically above tubular housing 32 is a rod 40.

Affixed to the exterior of tubular housing 32 is a first containment shell 42, supported by brackets 44A and 44B. A first hydraulic tube 46 connects a lower portion of containment shell 42 with tubular housing 32. A second hydraulic hose or hydraulic tubing 48 connects an upper portion of containment shell 42 with the interior of tubular housing 32, all for purposes to be described subsequently.

A second containment shell 50, supported to the exterior of tubular housing 32 by brackets 52A and 52B has a hydraulic tube 54 that communicates with the interior of gear box 36 in a manner that will be explained in detail.

The arrangement of FIG. 1 can be used in this way. After underwater tapping machine 30 is used to tap a hole in pipeline 10 through fitting 24, valve 28 can be closed and the tapping machine removed and installed on valve 20 and the procedure repeated. Valve 20 can then be closed and the tapping machine removed. Plugging devices (not shown) can be attached to valves 20 and 28 and the portion of the pipeline 10 between T-fittings 14 and 24 closed off. If it is necessary that flow continue through the pipeline during repair, a bypass pipeline can be installed between valves 56 and 58 extending from adapters 18 and 26 to permit the installation of a bypass pipeline (not shown). Thereafter a section of the pipeline 10 that includes damaged area 12 can be removed, such as by cutting out the damaged area 12 and welding in its place a new section of pipeline. After the repair is completed, the plugging devices can be removed. Systems exist for closing off T-fittings 14 and 24 allowing the adapters 18 and 26 and valves 20 and 28 to be removed, thus completing the repair of a damaged portion of pipeline 10 at many feet of ocean depth and without shutting down fluid flow through the pipeline.

In the example of a branch line to be added to the pipeline, a similar procedure would be employed. After underwater tapping machine 30 is used to tap a hole in the pipeline 10 through fitting 24, valve 28 can be closed and the tapping machine removed. The branch connection can then be installed.

Figure 2:
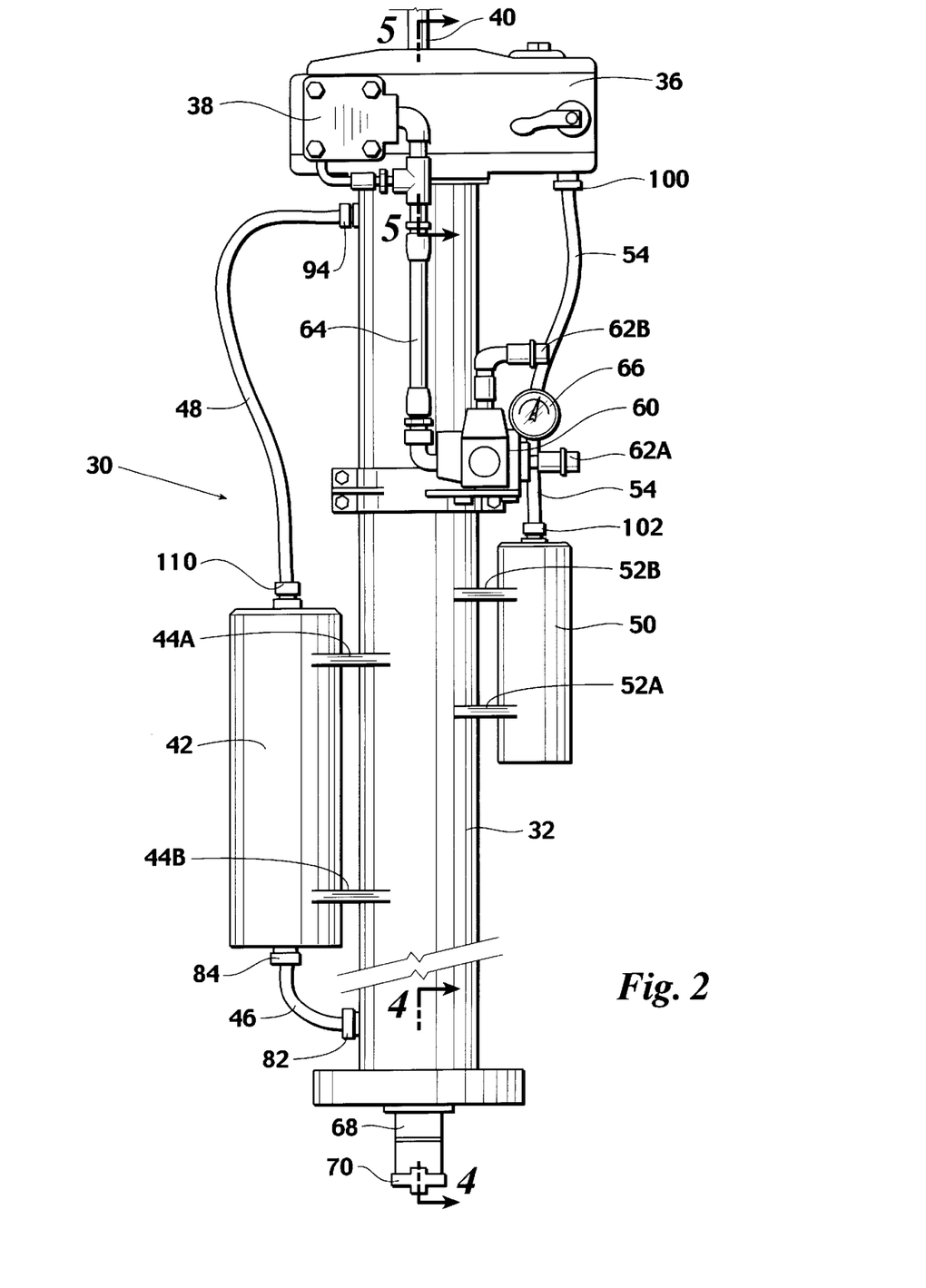
FIG. 2 is an elevational view of a subsea tapping machine that includes a system for equalizing the machine tubular body internal pressure with the pressure within the pipeline and for equalizing the internal pressure of the gear box with the hydrostatic pressure of surrounding sea water.

FIG. 2 shows in better detail the external appearance of an underwater tapping machine 30, it being understood that the actual external appearance of a tapping machine that includes the principals of this invention can vary considerably. FIG. 2 shows a hydraulic control system 60 with hydraulic hose connections 62A and 62B and hydraulic piping 64 that extend from control 62 to hydraulic drive motor 38, all of which is employed in providing hydraulic energy for operation of hydraulic drive motor 38 which, in turn, provides the rotational energy necessary for operating the underwater tapping machine. The drive motor 38 turns a gear in order to turn a boring bar (to be described) for rotational and axial movement during the tapping process. A feed motor 39 turns a feed screw which advances the boring bar axially without rotational movement. A gauge 66 is shown as employed as a part of the hydraulic control system for actuating the motor. It needs to be understood that these systems are shown only to illustrate a typical embodiment of an underwater tapping machine and the actual hydraulic systems employed may vary considerably and are not directly related to the essential features of the present invention.

Figure 4:
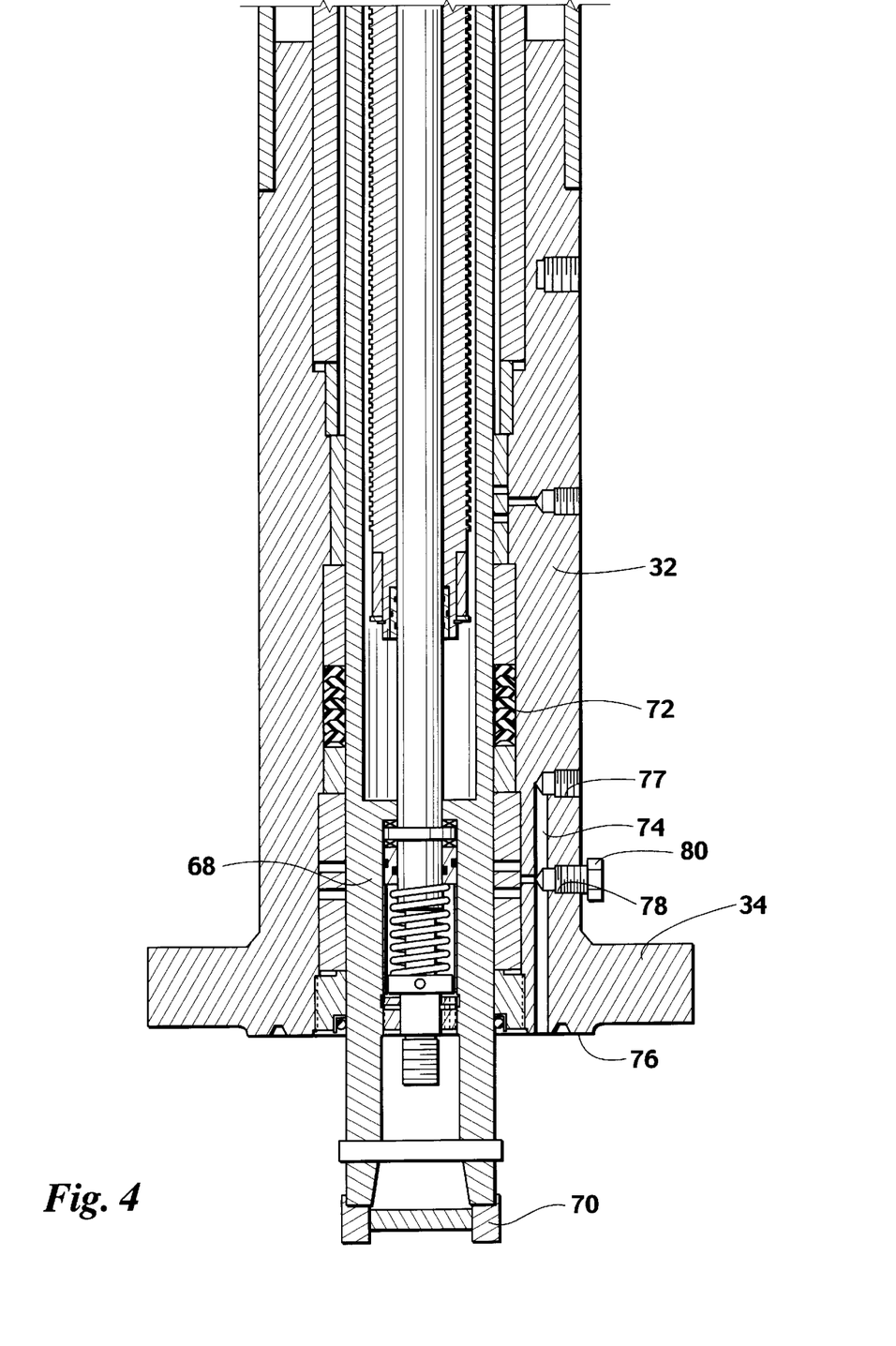
FIG. 4 is a cross-sectional view of the lower portion of a tapping machine showing the end portion which is attachable to a valve structure that in turn is attached to a pipeline to permit the tapping machine to be employed to tap an opening in a pipeline wall.

Referring to FIG. 4, the internal arrangement of the lower portion of underwater tapping machine 30 is shown. Extending telescopically and rotatably beyond the lower end of the underwater tapping machine, that is, below the lower flange 34 is a boring bar 68 that has, at the lower end thereof, a drive ring 70. A circular hole cutting saw (not shown) is driven by the drive ring 70 to cut a hole in a pipeline as the boring bar is rotated and axially downwardly advanced. Positioned within the interior tubular housing 32 are drive tube and feed screw mechanisms that are of the type commonly employed in tapping machines and that are utilized to control the axial advancement of boring bar 68, all of which is well known to practitioners in the art of tapping machines and are explained in detail in U.S. Pat. Nos. 3,614,252; 4,579,484 and 5,439,331, all of which are incorporated herein by reference.

Of significance in FIG. 4 is the provision of an internal seal 72 that seals the exterior of boring bar 68 against the interior of tubular housing 32 to prevent fluid flow along the exterior of the boring bar into the interior of the tubular housing. Another feature that is important in FIG. 4 is the provision of a passageway 74 that communicates with the lower end 76 of the tubular housing. When an opening is formed in the wall of a pipeline, passageway 74 is in communication with the interior of the pipeline. That is, pressure from the interior of a pipeline, whether gas or liquid, communicates through passageway 74 to a threaded opening 77 formed in the exterior wall of tubular housing 32. A second tubular opening 78 is shown that is closed with a plug 80.

Passageway 74 communicates by way of threaded opening 76 with hydraulic tube 46 as shown in FIG. 2. More specifically, a fitting 82 as shown in FIG. 2 is threaded into threaded opening 76 to attach hydraulic tube 46. A fitting 84 is used to attach the upper end of hydraulic tube 46 to the lower end of containment shell 42. Thus, passageway 74 provides a means of communicating the interior pressure of a pipeline that has been penetrated with the interior of containment shell 42.

Figure 5:
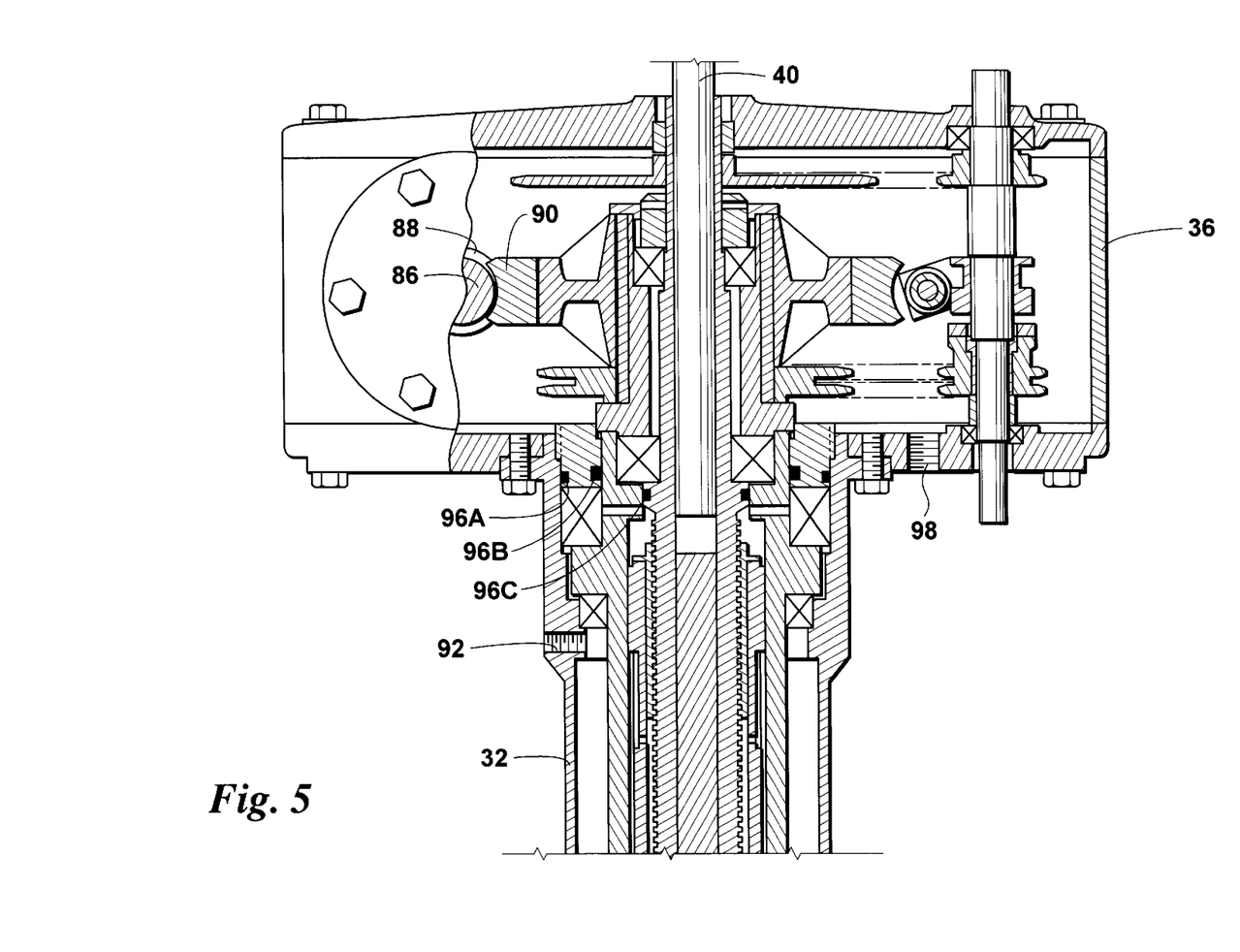
FIG. 5 is a cross-sectional view of the upper portion of a tapping machine showing the gear box by which rotary motion is transferred from a motor shaft to a feed screw by which the boring bar is both rotated and axially advanced. Further.

Referring now to FIG. 5, a cross-sectional view of the upper portion of the underwater tapping machine shows particularly gear box 36, the mechanisms internally of the gear box are explained in detail in U.S. Pat. No. 5,439,331 and are well known to practitioners in the art of manufacturing and operating tapping machines. For the purpose of this disclosure it is important only to know that the mechanisms within the gear box functions to employ rotary energy from a motor shaft 86 that has a worm gear 88 thereon that, in turn, engages driven gear 90 to rotate the mechanism that result in rotational energy applied to a boring bar and to a feed screw by which the boring bar is axially advanced.

FIG. 5 shows a threaded opening 92 that communicates between the interior and exterior of tubular housing 32. FIG. 2 shows a fitting 94 that is threaded into threaded opening 92 and connects the upper end of hydraulic tube 48 with the interior of tubular housing 32.

As seen in FIG. 5, the interior of tubular housing 32 is sealed from the interior of gear box 36 by seals, represented by seals 96A, 96B and 96C. These seals are indicative of sealing arrangements that are typically employed to sealably separate the interior of these two major components of the underwater tapping machine and the actual sealing arrangements may vary considerably.

Formed in gear case 36, as seen in FIG. 5, is a threaded opening 98 that communicates the interior of the gear box with the exterior thereof. Threaded opening 98 receives a fitting 100 as seen in FIG. 2, fitting 100 serving to connect the upper end of hydraulic tube 54 with threaded opening 98 and thereby to connect hydraulic tube 54 to the interior of gear box 36. At the lower end of hydraulic tube 54, a fitting 102 provides connection with the interior of second containment shell 50.

Figure 3:
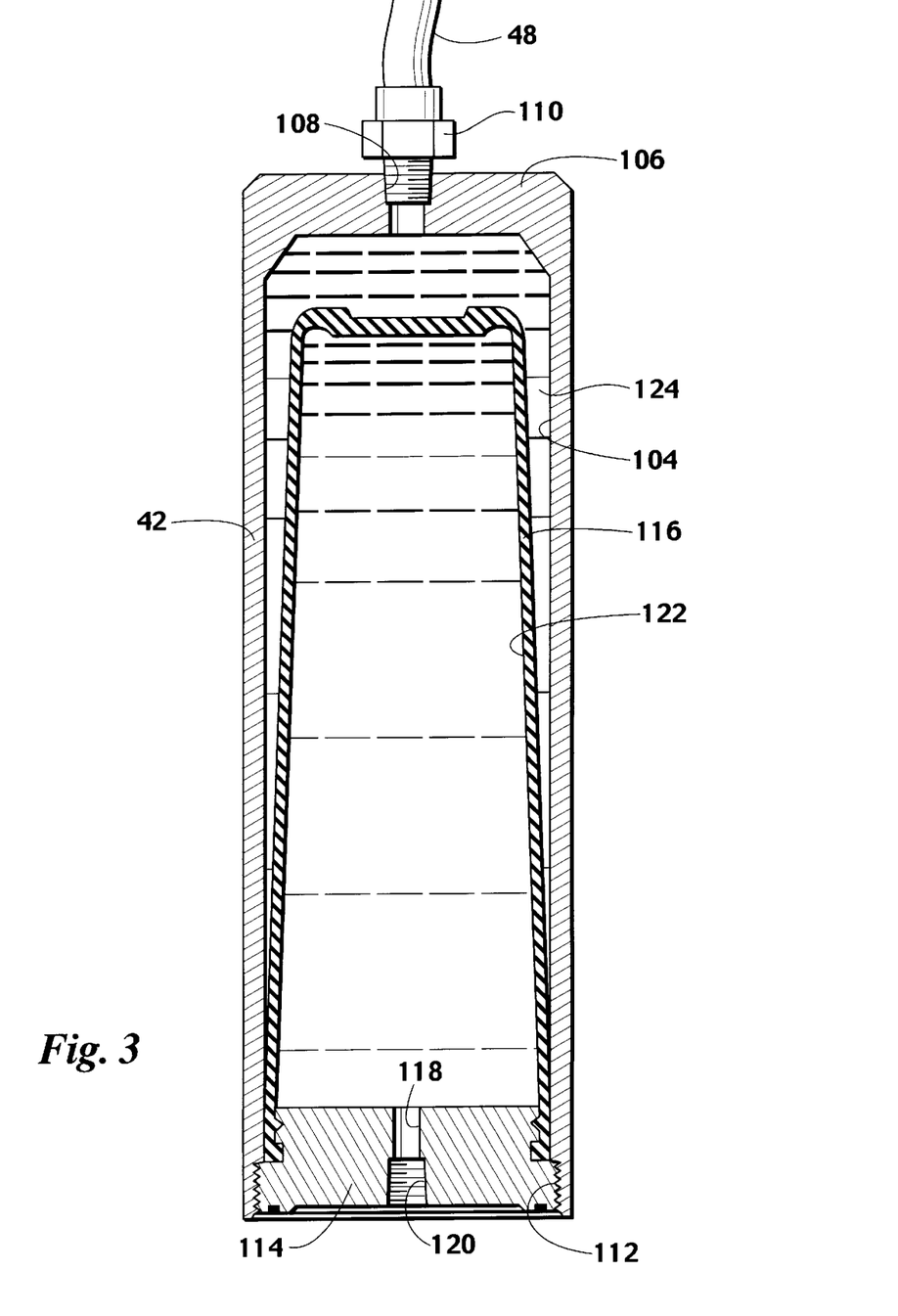
FIG. 3 is an enlarged cross-sectional view of a containment vessel having a flexible bladder that separates the interior of the containment vessel into two portions, the volume of the two portions being variable according to the position of the flexible bladder. The containment vessel of FIG. 3 is representative of the type employed with the present invention. One containment vessel is employed in the system to equalize pressure within a subsea tapping machine tubular housing with the internal pressure of the pipeline being tapped and another such containment vessel is utilized to equalize pressure between the exterior of the tapping machine with the pressure interior of the machine gear box, that is, to equalize the pressure inside the gear box with the hydrostatic pressure outside the gear box in a subsea application.

Referring now to FIG. 3, a cross-sectional view of first containment shell of 42 is shown. Containment shell 42 has an interior 104 that is closed at its upper end 106, the closed end having a threaded opening 108 therein. A fitting 110 is threadably received in the opening 108 and provides means for attachment of the lower end of hydraulic tube 48 as seen in FIG. 2.

The lower end of containment shell 42 has internal threads 112 that receives an externally threaded plug 114. Secured to a portion of plug 114 is the lower end of an elastomeric bladder 116. Containment shell 42 is a commercially available device and is frequently referred to as a "bladder accumulator" and a form of such bladder accumulator is illustrated and described in detail in U.S. Pat. No. 3,907,000 which is incorporated herein by reference.

Plug 114 has an opening 118 therethrough, the lower end portion of the opening having internal threads 120 which receives fitting 84 as shown in FIG. 2. Thus, by comparing FIGS. 2 and 3, it can be seen that the interior 122 of bladder 116 is in closed communication with hydraulic tube 46 which, in turn, as seen with reference to FIG. 4, is in closed communication with the interior of a pipeline after it has been penetrated by a circular saw, the communication with the pipeline being provided through passageway 74. The internal area of containment shell 42 externally of bladder 116, such area being indicated by the numeral 124, is in closed communication, as seen in FIG. 2, with the upper interior of tubular housing 32 by way of hydraulic hose 48 and fitting 94 and by way of threaded opening 92, as seen in FIG. 5.

By virtue of the flexibility of bladder 116 the relative volumetric area between the interior of the bladder 122 and the volumetric area 124 exterior of the bladder can vary while the external area 124 remains at all times filled with lubricating fluid (oil) so that at all times the interior of tubular housing 32 is supplied with the required lubricating fluids for operation of the boring mechanisms. When a circular saw attached to the lower end of boring bar 68 penetrates a pipeline, pressure is communicated with the interior of bladder 116 and due to the flexibility of the bladder, equal pressure is applied to the hydraulic fluid within volumetric area 124 and thence to the interior of the tubular housing 32 so that the pressure within the housing is equal to the pressure within the pipeline. Since the pressure is equalized on opposite sides of seals 72 as seen in FIG. 4, the possibility of leakage of pipeline fluid into the interior of tubular housing 32 is substantially eliminated and further, by the pressure equalization applied within the boring bar, a hydraulic force that would otherwise be applied to resist the axial downward movement of boring bar 68 is balanced, making the operation of the boring mechanism substantially less strenuous.

Second containment shell 50 as seen in FIGS. 1 and 2 has a cross-sectional area the same or essentially the same as in FIG. 3, however, the application of containment shell 50 differs. The upper end of second containment shell 50 is attached by way of fitting 102 (See FIG. 2) and hydraulic tube 54 and fitting 100 to the interior of gear case 36. Containment shell 50 has a bladder like bladder 116 in FIG. 3. The only difference between the application of containment shell 42 and that of containment shell 50 is that containment shell 50 does not require a fitting attached to a threaded opening in the lower end of the containment shell. Instead, the lower passageway is left open and unobstructed so that it is in direct communication with the ambient subsea water surrounding the tapping machine. Water, such as sea water, is free to flow through passageway 118 as seen in FIG. 3 so that the interior 122 of bladder 116 is at the hydrostatic pressure of the sea water. If desired, a filter element can be placed over opening 118 to filter water in and out without impairing the flow of water as required to equalize the pressure exterior of the containment shell and that within the interior of the bladder. Lubricant liquid that is within the containment shell and exterior of the bladder is communicated by way of hydraulic tube 54 (FIG. 2) to the interior of gear case 36. This means that the hydrostatic pressure within the interior of gear case 36 is equalized with the ambient hydrostatic pressure of the water in which the tapping machine is employed. This removes any possibility of the gear case being collapsed by high ambient sea water pressure and further, removes the likelihood of leakage of seals employed in the gear.

The use of a bladder such as bladder 116 of FIG. 3 is one example of a type of pressure equalizer applicable for this invention however other types of pressure equalizer can be used, such as a piston moveable in a cylinder. The terms "pressure equalizer" and "fluid isolating equalizer" are inclusive of any device that transfers pressure without transferring liquids or gasses from one environment to another.

Thus, the invention provides a unique subsea tapping machine that has provision for balancing the pressure within a pipeline that is penetrated by a circular saw operated by the machine with the interior of the machine tubular housing and wherein the interior pressure within the tapping machine gear box is balanced against the ambient hydrostatic pressure of the sea water in which the tapping machine is employed. Further, these advantages are accomplished without any actuating mechanism, and does not require any electrical or mechanical energy, any control valves or any action on the part of the operator to achieve a complete balancing of the critical pressures within an underwater tapping machine.

As previously stated, the actual appearance of an underwater tapping machine that employs the principles of this invention may vary considerably from those illustrated and the specific configuration of the containment shells and the configuration of the bladders within the containment shells may vary while the principals of the invention are maintained. Normally the containment shell 42 will be of substantially greater size than containment shell 50. Containment shell 42 will typically be sized to contain 5 to 10 gallons of lubricating fluid within the area 124 exterior of the bladder when the boring bar is advanced in its furthest downward position while containment shell 50 requires a minimal volume change, normally only that which results in the compression of any air trapped within the gear case 36 so that thereby the containment shell 50 may be about 1 gallon in size. If the diameter of tubular housing 32 varies or the length of the stroke of the boring bar varies, then greater or smaller sizes of containment shells 42 will be required.

The specific mechanisms by which containment shells 42 and 50 are attached to the exterior of tubular housing 32 can vary. Normally straps (not shown) are used to retain the containment shells to the exterior, however, other mechanisms may be employed to secure the containment shells to the tubular housing.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A machine for use underwater and therefor subject to ambient hydrostatic pressure for tapping a pressurized pipeline comprising:

an elongated tubular tapping machine body having a boring bar that receives a cutter at its lower end, the boring bar being axially displaceable to move said cutter into and out of engagement with a pipeline;

a fluid passageway in a lower end portion of said tapping machine body by which the internal pressure of a pipeline is sensed after the pipeline is penetrated by said cutter;

a pressure equalizer having a first communication with said fluid passageway and a second communication with the interior of said tapping machine body to balance hydraulic forces applied to said boring bar during a tapping operation;

a gear case affixed to said tapping machine body adapted to actuate said boring bar and having a shaft for receiving rotative power input, said tapping machine body being sealed from the gear case;

a second fluid isolating equalizer supported in relationship to said tapping machine body and having a first communication with the interior of said gear box and a second communication with the ambient hydrostatic pressure; and a conduit connecting said bladder opening to the interior of said gear box to thereby at least substantially equalize pressure within said gear box with the ambient hydrostatic pressure.

2. A machine according to claim 1 wherein said second fluid isolating pressure equalizer is in the form of a flexible bladder having one surface in communication with said gearbox providing said first communication and having a second surface in contact with the ambient hydrostatic pressure providing said second communication.

3. A machine according to claim 2 including a containment shell supported in relationship to said tapping machine body, said flexible bladder being contained within the containment shell.

4. For use with an underwater machine for tapping a hole in a pressurized pipeline in which the machine is subjected to ambient hydrostatic pressure, the machine having an elongated tubular tapping machine body having a boring bar that receives a cutter at its lower end, the bar being axially displaceable to move the cutter into and out of engagement with the pressurized pipeline and the machine having a gear case affixed to said tapping machine body adapted to actuate said boring bar and having a shaft for receiving rotative power input, a method of equalizing pressures within said tapping machine body and said gear case comprising:

sensing the pressure within said pipeline;

applying the sensed pipeline pressure to a first fluid isolating pressure equalizer;

applying an equalizing output pressure from said first pressure equalizer to the interior of said tubular tapping machine body;

sensing the ambient hydrostatic pressure to which the machine is subjected;

applying the sensed ambient pressure to a second fluid isolating pressure equalizer; and applying an equalizing output pressure from said second pressure equalizer to the interior of said gear case.

* * * * *

UNITED STATES PATENT AND TRADEMARK OFFICE
CERTIFICATE OF CORRECTION

PATENT NO.    : 6,012,878
DATED         : January 11, 2000
INVENTOR(S)   : David J. Hicks It is certified that error appears in the above-identified patent and that said Letters Patent is hereby corrected as shown below:

Column 10,
Line 6, replace "connecting" with -- providing --.
Line 6, replace "bladder opening" with -- first communication --.

Signed and Sealed this

Twenty-sixth Day of August, 2003

JAMES E. ROGAN
*Director of the United States Patent and Trademark Office*